(12) United States Patent
Senoh et al.

(10) Patent No.: US 8,379,386 B2
(45) Date of Patent: Feb. 19, 2013

(54) ELECTRONIC APPARATUS (75) Inventors: Toshiya Senoh, Nara (JP); Takeshi Mori, Osaka (JP); Jun Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 12/976,104

(22) Filed: Dec. 22, 2010

(65) Prior Publication Data
US 2011/0199730 A1 Aug. 18, 2011

(30) Foreign Application Priority Data

Feb. 17, 2010 (JP) .................................. 2010-032812
Feb. 23, 2010 (JP) .................................. 2010-037429

(51) Int. Cl.
*H05K 7/20* (2006.01)

(52) U.S. Cl. .............. 361/695; 361/679.46; 361/679.48; 361/679.49; 361/679.5

(58) Field of Classification Search .................. None
See application file for complete search history.

(56) References Cited

U.S. PATENT DOCUMENTS

| | | | |
|---|---|---|---|
| 5,898,568 A | 4/1999 | Cheng | |
| 6,496,369 B2 * | 12/2002 | Nakamura | 361/697 |
| 6,643,129 B2 * | 11/2003 | Fujiwara | 361/679.47 |
| 6,958,910 B2 * | 10/2005 | Tanaka et al. | 361/699 |
| 7,123,478 B2 | 10/2006 | Chen | |
| 7,289,320 B2 | 10/2007 | Chang et al. | |
| 7,336,489 B1 | 2/2008 | Chen et al. | |
| 7,405,930 B2 * | 7/2008 | Hongo et al. | 361/679.48 |
| 8,072,754 B2 * | 12/2011 | Zhang et al. | 361/695 |
| 8,107,239 B2 * | 1/2012 | Fujiwara | 361/695 |
| 8,243,448 B2 * | 8/2012 | Aoki | 361/697 |
| 2008/0019093 A1 | 1/2008 | Hongo | |

FOREIGN PATENT DOCUMENTS

| | | |
|---|---|---|
| CN | 201115184 Y | 9/2008 |
| CN | 101483992 A | 7/2009 |
| CN | 201830601 U | 5/2011 |
| CN | 202018625 U | 10/2011 |
| JP | 2003-131759 | 5/2003 |
| JP | 2006-147618 | 6/2006 |
| JP | 2007-324339 | 12/2007 |

* cited by examiner

*Primary Examiner* — Boris Chervinsky
(74) *Attorney, Agent, or Firm* — Hamre, Schumann, Mueller & Larson, P.C.

(57) ABSTRACT

An electronic apparatus includes the following: a heat dissipation chamber that is formed by liquid tightly separating the inside of a main unit case with a partition, has an inlet air vent and an outlet air vent in the partition, and includes a heat dissipation portion; a cooling fan that is located in the heat dissipation chamber; an inlet that is provided in the main unit case to introduce outside air into the heat dissipation chamber through the inlet air vent; and an outlet that is provided in the main unit case to exhaust an air flow sent from the cooling fan to the outside through the outlet air vent. An air channel that extends from the inlet air vent through a side wall of the main unit case to communicate the heat dissipation chamber with the inlet is liquid tightly sealed from the internal space of the main unit case with a sealing wall. A plurality of plate-shaped ribs are provided in the air channel so as to extend in a flow path direction and arranged in a lateral direction of the inlet air vent. The rigidity of the main unit case can be ensured sufficiently while maintaining the liquid tightness between the inside of the main unit case and the heat dissipation chamber.

10 Claims, 13 Drawing Sheets

ELECTRONIC APPARATUS

BACKGROUND OF THE INVENTION

1. Field of the Invention

The present invention relates to an electronic apparatus including a heat generating element, e.g., a notebook PC (personal computer) including a heat generating element such as a CPU (central processing unit). In particular, the present invention relates to a heat dissipation structure for dissipating heat from the heat generating element.

2. Description of Related Art

For example, in the case of a notebook PC, the amount of heat generated from a heat generating element such as a CPU increases as the performance of the notebook PC is improved. Therefore, it is likely that the configuration of a conventional heat dissipation device cannot dissipate heat sufficiently. Thus, a high-performance heat dissipation structure has been demanded. For example, when the heat dissipation structure uses an air flow produced by a cooling fan, the shape and arrangement of a heat dissipation fin, the interrelationship between the heat dissipation fin and a cooling fan, or the like have to be optimized.

Figure 19:
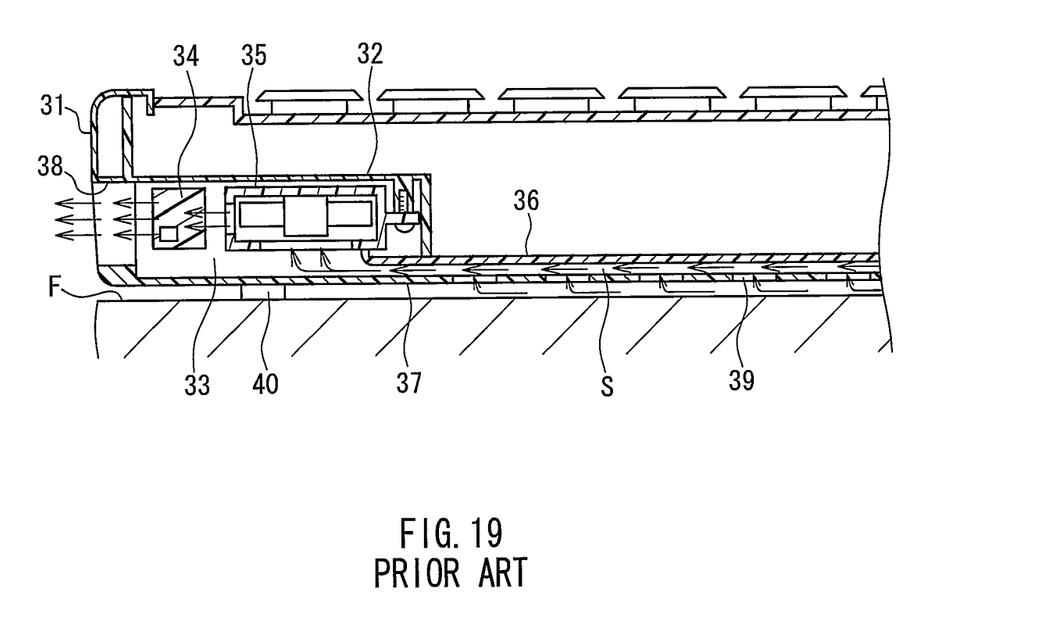
FIG. 19 is a cross-sectional view showing a heat dissipation structure of a conventional electronic apparatus.

Moreover, in the case of the electronic apparatus for which compactness is critical such as the notebook PC, the arrangement of the cooling fan and the heat dissipation fin is limited strictly. Under these circumstances, e.g., JP 2007-324339 A discloses a notebook PC having a heat dissipation structure, as shown in FIG. 19.

In this heat dissipation structure, a heat dissipation chamber 33 is formed by a partition 32 in a case 31, and a heat dissipation member 34 and a cooling fan 35 are located in the heat dissipation chamber 33. Although not shown in FIG. 19, heat is transferred from a heat generating component located inside the case 31 to the heat dissipation member 34 through the partition 32 via a heat-transfer member. The case 31 has a shape such that the lower portions of the heat dissipation chamber 33 and its adjacent area are open. The lower portion of the adjacent area to the heat dissipation chamber 33 is closed off with a lower partition 36, thereby ensuring liquid tightness for components housed in the area of the case 31 other than the heat dissipation chamber 33.

The bottom including the lower portions of the heat dissipation chamber 33 and the lower partition 36 is closed off with a cover 37. There is a gap S between the cover 37 and the lower partition 36. An outlet 38 communicating with the heat dissipation chamber 33 is provided in the side of the case 31, and inlets 39 are provided in the cover 37. A leg 40 is used to form a space between the bottom of the case 31 and a supporting surface F. Therefore, the heat dissipation chamber 33 communicates with outside air through the bottom of the case 31 via the inlets 39 and the gap S. By driving the cooling fan 35, the outside air is drawn through the inlets 39, blown toward the heat dissipation member 34, and exhausted from the outlet 38.

The heat dissipation structure disclosed in JP 2007-324339 A is intended to be compact with the effective use of a limited space in the case 31. However, it is difficult to make the heat dissipation structure sufficiently compact. This is because the lower partition 36 is required inside the bottom wall of the case 31 to form an intake path for the outside air, since the air is drawn through the bottom of the case 31.

Moreover, it is inevitable that the rigidity will be reduced in the area of the heat dissipation chamber 33 of the case 31. This is because, in order to form the heat dissipation chamber 33, the case 31 has to have a shape such that the lower portions of the heat dissipation chamber 33 and its adjacent area are open, and the bottom of the case 31 is closed off with the cover 37.

On the other hand, another configuration can be considered, in which an inlet or outlet is provided while maintaining the bottom wall of a case, and a heat dissipation chamber is formed liquid tightly in the case using an internal partition. In this case, however, an air channel is needed to communicate the heat dissipation chamber with the inlet or outlet, and the air channel should be liquid tight to the inside of the case. Moreover, a decrease in the rigidity of the case caused by providing the inlet or outlet in the side wall of the case may be a problem.

SUMMARY OF THE INVENTION

With the foregoing in mind, it is an object of the present invention to provide an electronic apparatus with a heat dissipation structure that can maintain the liquid tightness of a heat dissipation chamber including a cooling fan with respect to the inside of a main unit case, and also can ensure the rigidity of the main unit case sufficiently.

An electronic apparatus of the present invention includes the following: a main unit case that houses electric components including a heat generating element; a heat dissipation chamber that is formed by liquid tightly separating an internal space of the main unit case with a partition and is provided with an inlet air vent and an outlet air vent in the partition, in which a heat dissipation portion is positioned; a cooling fan that is located in the heat dissipation chamber so as to send air to the heat dissipation portion; an inlet that is provided in the main unit case to introduce outside air into the heat dissipation chamber through the inlet air vent; and an outlet that is provided in the main unit case to exhaust an air flow sent from the cooling fan to the outside through the outlet air vent.

To solve the above problem, in the electronic apparatus of the present invention, an air channel for communicating the heat dissipation chamber with the inlet is formed so as to extend from the inlet air vent through a side wall of the main unit case, and is liquid tightly sealed from the internal space of the main unit case with a sealing wall. A plurality of plate-shaped ribs are provided in the air channel so as to extend in a flow path direction and arranged in a lateral direction of the inlet air vent to divide the air channel into a plurality of sub-channels.

With the above configuration, the rigidity of the main unit case can be ensured sufficiently while maintaining the liquid tightness between the inside of the main unit case and the heat dissipation chamber. Since the air channel for communicating the heat dissipation chamber with the outside of the main unit case has a structure with higher rigidity due to the plate-shaped ribs, a reduction in rigidity caused by the presence of the air channel can be avoided.

DETAILED DESCRIPTION OF THE INVENTION

Based on the above configurations, the electronic apparatus of the present invention can have the following aspects.

The heat dissipation chamber may be provided in a corner area in a plan view of the main unit case, the inlet may be provided in a side wall that forms one side of the corner area, and the outlet may be provided in a side wall that forms the other side that intersects the one side provided with the inlet.

Moreover, the partition for partitioning the heat dissipation chamber may be formed of a partition member different from the main unit case, and the partition member may surround the heat dissipation chamber to form a closed space.

Moreover, a part of the partition for partitioning the heat dissipation chamber may be formed by extending the main unit case inwardly.

Moreover, at least one surface of the partition may include a removably attached cover member.

Moreover, the inlet may include a first inlet that is provided in either a lower surface or an upper surface of the main unit case and a second inlet that is provided in a side of the main unit case when the electronic apparatus is placed in an operating state.

Moreover, the first inlet may include an inclined plane that is inclined from the lower surface toward the upper surface of the main unit case.

Moreover, the second inlet may continue to the first inlet.

Moreover, a pair of grip holders may be provided on one side wall of the main unit case and spaced from each other, and each of the grip holders protrudes so that a small space is formed outside the side wall, a hand grip grasped by the hand for carrying the electronic apparatus may be supported by the grip holders, the inlet may be provided in the grip holder, and the air channel may be open to the small space in the grip holder and thus communicate with the inlet.

Moreover, the hand grip may be connected between the grip holders and supported on a side of the main unit case in a position shifted toward the upper surface, stepped portions may be formed between the lower surface of the main unit case and the connecting portions of the hand grip to each of the grip holders, and the first inlet may be formed at a surface of the grip holder located on the same side as the lower surface of the main unit case and the second inlet may be formed in the stepped portion.

Hereinafter, embodiments of the present invention will be described with reference to the drawings.

Embodiment 1

Figure 1:
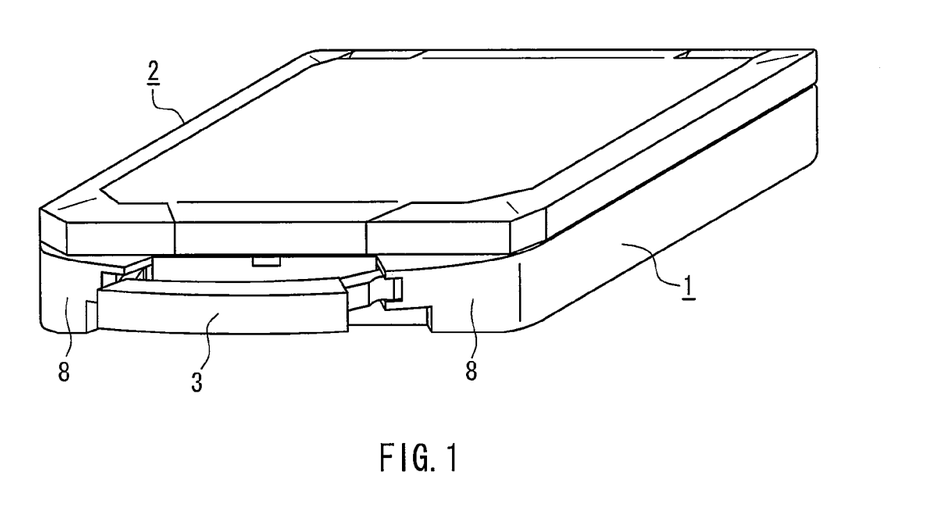
FIG. 1 is a perspective view showing a non-operating state of a notebook PC as an example of an electronic apparatus in Embodiment 1 of the present invention.
Figure 2:
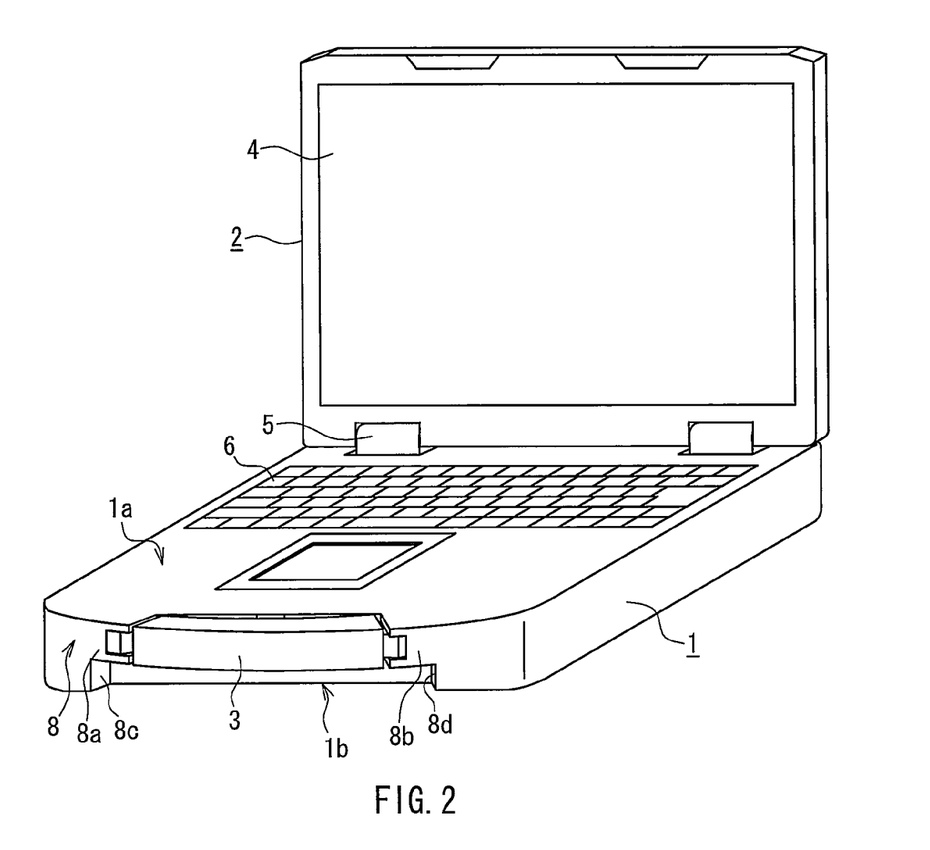
FIG. 2 is a perspective view showing an operating state of the notebook PC.

FIG. 1 is a perspective view showing the appearance of a notebook PC as an example of an electronic apparatus in Embodiment 1. The notebook PC includes a main unit case 1, a display unit case 2, and a hand grip 3. FIG. 1 shows a non-operating state. FIG. 2 is a perspective view of the notebook PC in an operating state. The upper side and the lower side of the main unit case 1 when the notebook PC is in the operating state are defined as a main unit upper surface 1a and a main unit lower surface 1b, respectively.

The main unit case 1 contains a CPU, a circuit board on which various electric elements are mounted, a hard disk drive, a battery, or the like. The display unit case 2 is provided with a liquid crystal display 4 for displaying images, characters, or the like. The display unit case 2 is supported rotatably by the main unit case 1 with hinges 5. A keyboard 6 and a pointing device 7 are provided on the main unit upper surface 1a.

The pointing device 7 is fixed in the main unit case 1 with its operating surface exposed on the surface of the main unit case 1. It is desirable that the main unit case 1 is molded of a light metal such as aluminum or magnesium or an alloy thereof so as to maintain the ruggedness of the notebook PC.

A pair of grip holders 8 is formed on one side of the main unit case 1. The grip holders 8 are spaced from each other and protrude from the side of the main unit case 1 to form convex portions. The hand grip 3 is connected between the grip holders 8 and grasped by the user's hand for carrying the notebook PC.

The grip holders 8 have connecting portions 8a, 8b, to which the hand grip 3 is connected. Each one of the connecting portions 8a, 8b is provided at a position shifted toward the main unit upper surface 1a and extends to the other grip holder 8. The hand grip 3 is connected to the connecting portions 8a, 8b, and therefore supported on the side of the main unit case 1 in a position shifted toward the main unit upper surface 1a. Thus, in the posture of the notebook PC shown in FIG. 1, a space is formed between the hand grip 3 and the surface on which the notebook PC is placed. This makes it easy for a user to put his/her fingers in that space when carrying the notebook PC. Moreover, the hand grip 3 and the connecting portions 8a, 8b are connected movably to each other. Accordingly, the hand grip 3 can be retracted toward the main unit case 1 (see FIG. 2) and extended from the main unit case 1 (see FIG. 1).

Figure 3:
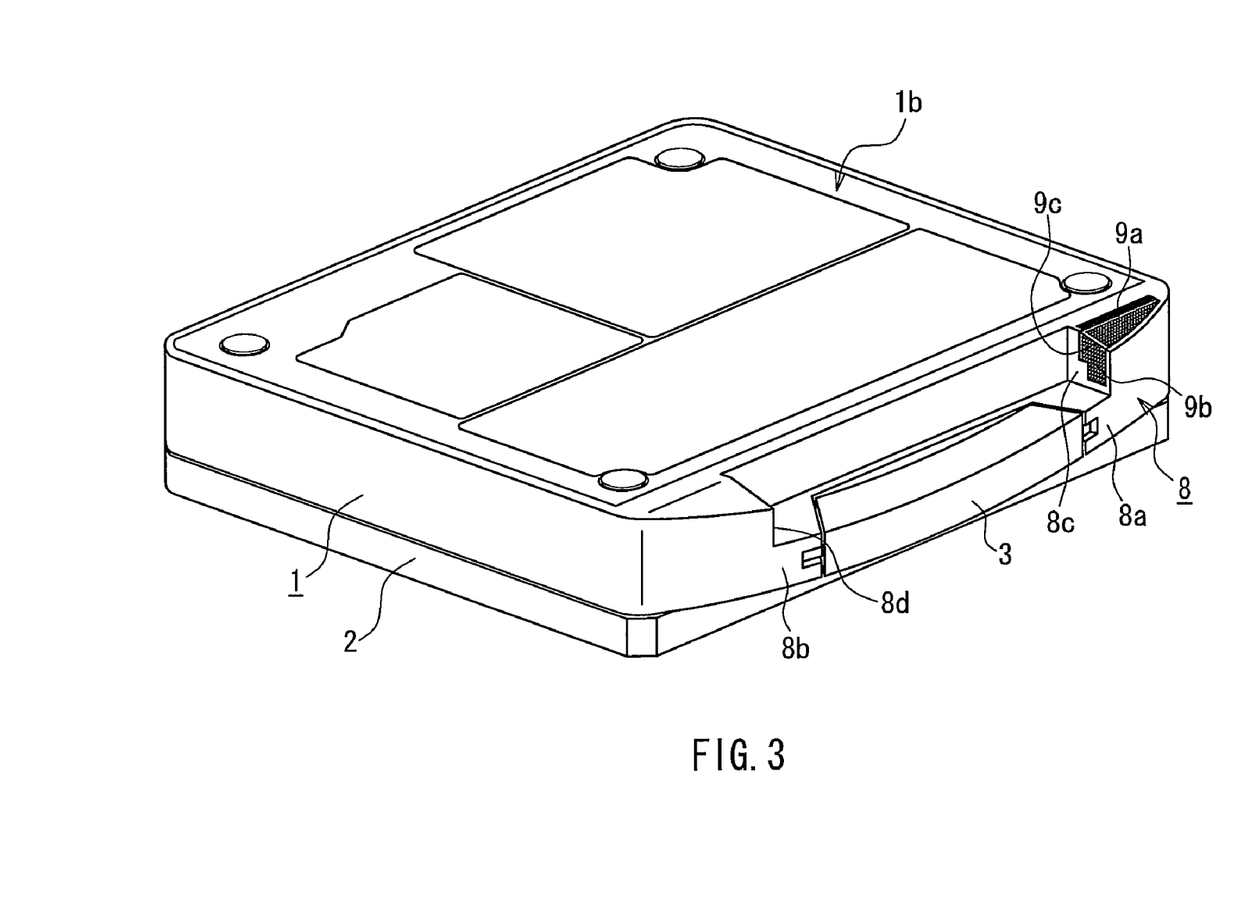
FIG. 3 is a perspective view of the notebook PC in the state of FIG. 1 when it is viewed from the back.

FIG. 3 is a perspective view showing a state in which the notebook PC in the state of FIG. 1 is placed face down. To provide the space between the hand grip 3 and the surface on which the notebook PC is placed in the state of FIG. 1, stepped portions 8c, 8d are formed between the connecting portions 8a, 8b and the surface of the grip holder 8 located on the same side as the main unit lower surface 1*b*, respectively. Moreover, the grip holder 8 on the right in FIG. 3 (the grip holder 8 with the connecting portion 8*a*, i.e., on the left in FIG. 1) has a first inlet 9*a* and a second inlet 9*b* to provide a part of the function of a heat dissipation structure, as will be described later.

The first inlet 9*a* is formed at the surface of the grip holder 8 located on the same side as the main unit lower surface 1*b*, and therefore is flush with the main unit lower surface 1*b*. The second inlet 9*b* is formed in the stepped portion 8*c* and continues to the first inlet 9*a* via an edge 9*c* that forms the corner. The first inlet 9*a* and the second inlet 9*b* are made of punching metal and ensure the ventilation characteristics due to their openings. However, the internal space of the main unit case 1 is not open directly through the first inlet 9*a* and the second inlet 9*b*. The grip holder 8 includes a small space that is outside the side wall defining the internal space of the main unit case 1, and the small space communicates with the external space through the first inlet 9*a* and the second inlet 9*b*.

Figure 4:
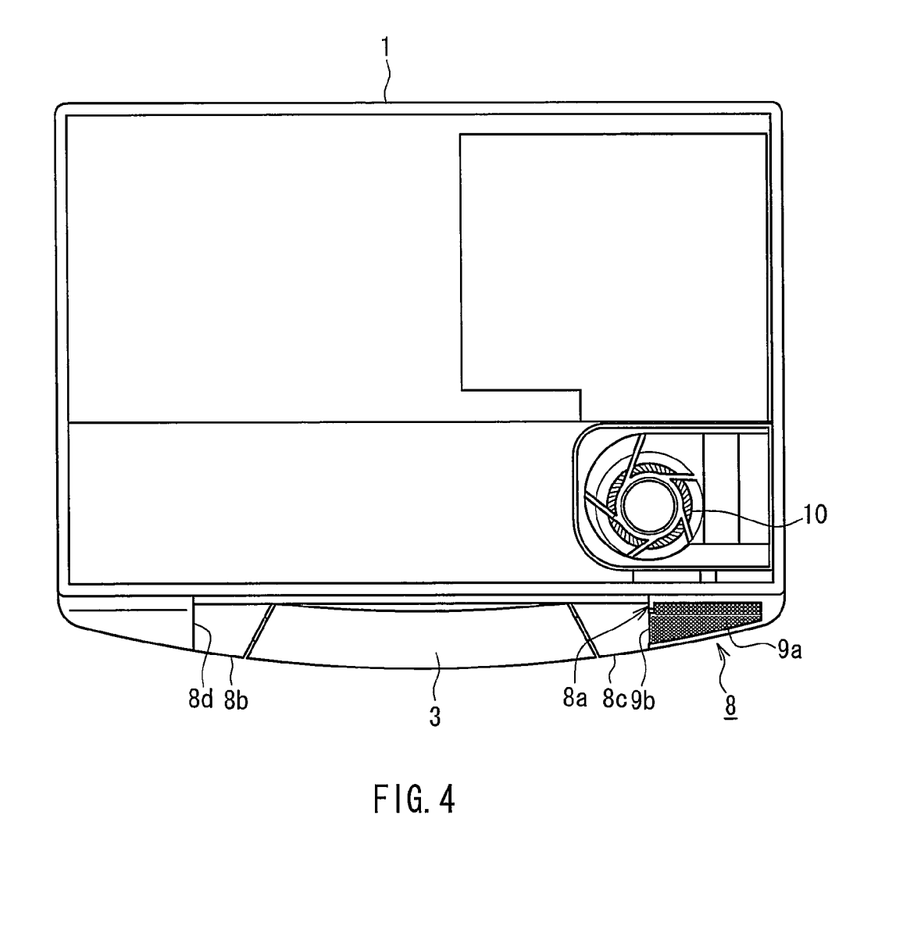
FIG. 4 is a schematic plan view of the internal structure of the notebook PC in the state of FIG. 3.
Figure 5:
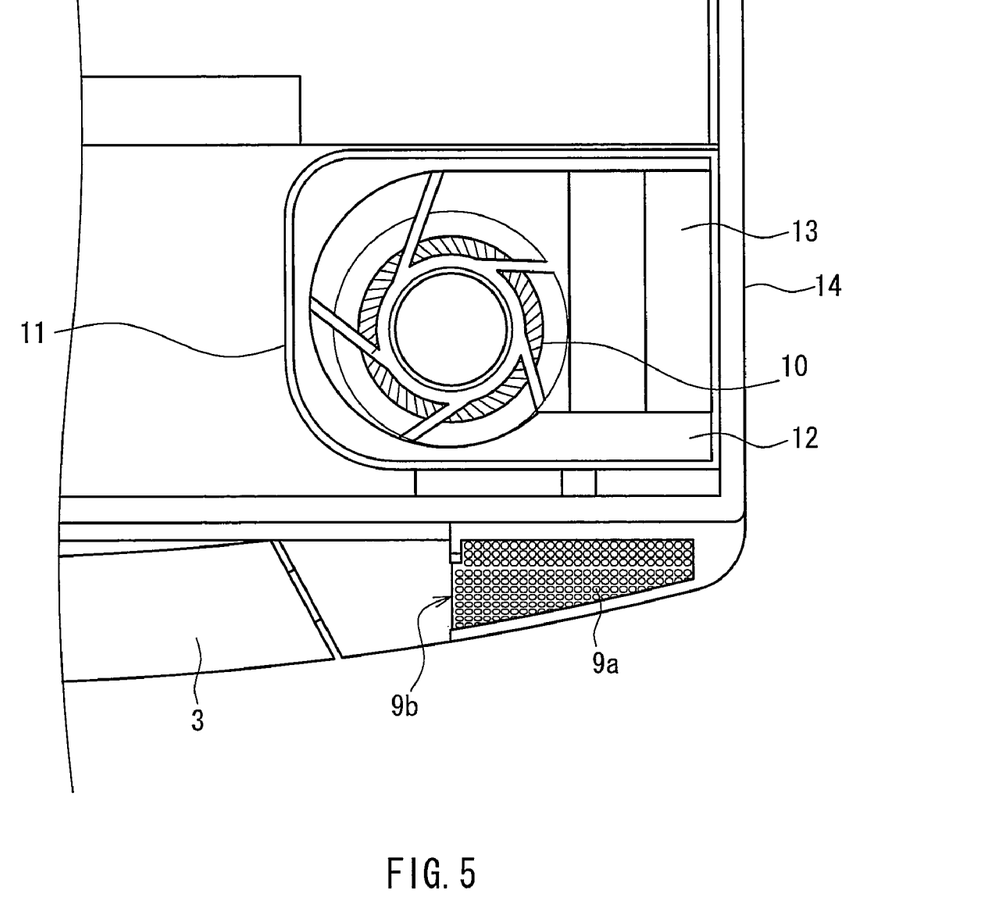
FIG. 5 is a partially enlarged plan view of the notebook PC in the state of FIG. 4.

FIG. 4 is a plan view showing a state in which the portion covering the back of the main unit case 1 (i.e., the main unit lower surface 1*b*) has been removed in the posture of the notebook PC shown in FIG. 3. FIG. 4 provides an overview of the internal structure of the notebook PC in this embodiment and illustrates only a particular part of the internal structure. This embodiment is characterized by the configuration associated with a cooling fan 10. Therefore, only the structure around the cooling fan 10 is shown specifically. FIG. 5 is an enlarged view of the area where the cooling fan 10 is located.

The cooling fan 10 is housed in a heat dissipation chamber 12 that is formed by separating the inside of the main unit case 1 with a partition 11. As shown in FIG. 4, the heat dissipation chamber 12 is located in the corner area in a plan view of the main unit case 1, and the partition 11 forms the bottom wall as well as the side wall of the heat dissipation chamber 12. That is, the partition 11 forms a case without the top wall. In the assembled state shown in FIGS. 1 to 3, a cover member (not shown) is attached to the top of the partition 11. The combination of the partition 11 and the cover member surrounds the heat dissipation chamber 12 to form a closed space. However, the cover member may be formed integrally with other elements such as a cover constituting the main unit lower surface 1*b*.

The heat dissipation chamber 12 includes a heat dissipation fin 13 that receives the air flow from the cooling fan 10. The end of a heat pipe (not shown) extended from the CPU is located in the heat dissipation chamber 12 and joined to the heat dissipation fin 13. Therefore, heat generated from the CPU is transferred to the heat dissipation fin 13 via the heat pipe, and the heat dissipation fin 13 constitutes a heat dissipation portion. The heat dissipation portion is not limited to indirect heat dissipation by transferring heat from the heat generating element via the heat pipe. In accordance with the circumstances, the heat generating element may be located directly in the heat dissipation portion, and the heat may be dissipated directly by the air flow from the cooling fan. Thus, the heat dissipation portion is defined as either the heat generating element or the element to which heat is transferred from the heat generating element.

The partition 11 has liquid tightness to prevent water leakage between the heat dissipation chamber 12 and the inside of the main unit case 1. For example, a coupling element for connecting the cooling fan 10 to its driving portion and the heat pipe pass through the partition 11, and the portions of the partition 11 through which they are passing are provided with liquid-tight structures.

Figure 6:
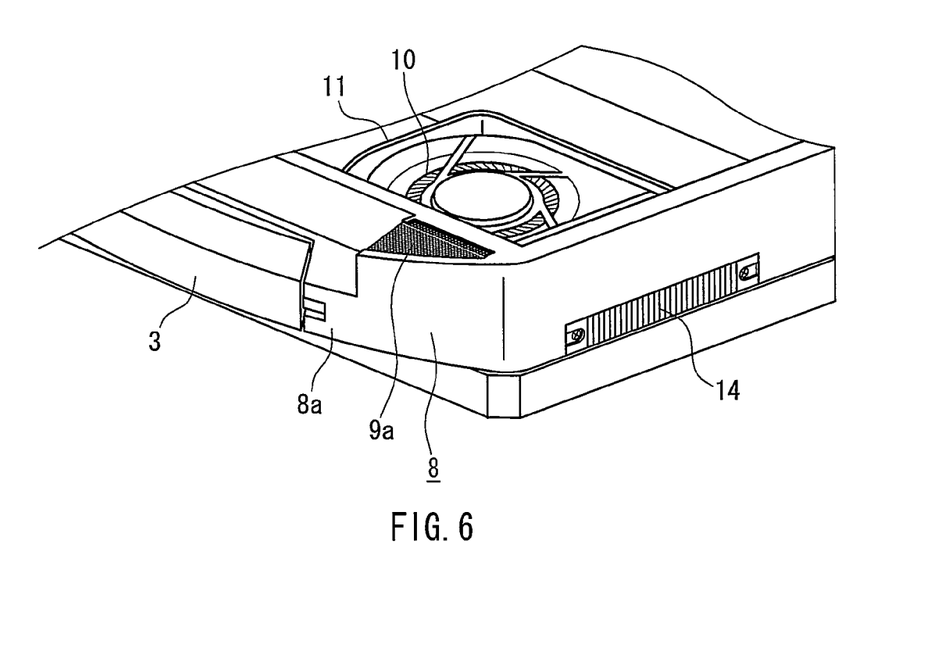
FIG. 6 is a perspective view of the portion of the notebook PC shown in FIG. 5 when it is viewed obliquely from the right front.

An outlet 14 is provided in the side of the main unit case 1 (the right side in FIG. 5) orthogonal to the side provided with the grip holder 8 that is adjacent to the heat dissipation chamber 12. FIG. 6 is a perspective view from the side of the outlet 14. Also, the outlet 14 communicates with the heat dissipation chamber 12, and the air flow sent from the cooling fan 10 to the heat dissipation fin 13 is discharged from the outlet 14.

As will be described later, air vents that communicate with the first and second inlets 9*a*, 9*b* and the outlet 14 are provided in the sides of the partition 11 of the heat dissipation chamber 12. On the air intake side, an air channel starting from the air vent is formed across the small space in the grip holder 8. Therefore, the cooling fan 10 draws outside air through a ventilation structure, in which the air enters from the first and second inlets 9*a*, 9*b* and flows through the air channel, and sends it toward the outlet 14. The air channel is liquid tightly sealed from the internal space of the main unit case 1 by a sealing structure that prevents water leakage, as will be described later.

Figure 7:
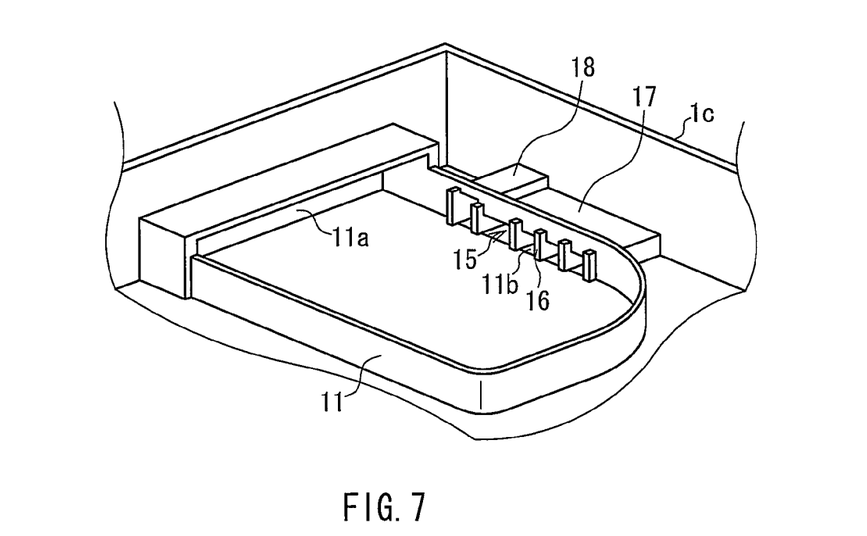
FIG. 7 is a perspective view showing a part of an air channel for communicating a heat dissipation chamber of the notebook PC with the outside of a main unit case.

The structure of the air channel will be described with reference to FIGS. 7 to 14. FIG. 7 is a perspective view showing the air channel 15 when viewed from the inside of the heat dissipation chamber 12. For ease of understanding of the drawing, the elements such as the cooling fan 10 located in the heat dissipation chamber 12 are removed. The partition 11 has an outlet air vent 11*a* in the side corresponding to the outlet 14 and an inlet air vent 11*b* in the side corresponding to the first and second inlets 9*a*, 9*b*.

The inlet air vent 11*b* is formed so that one end of the air channel 15 is open to the inside of the heat dissipation chamber 12, and therefore is long in a lateral direction. A plurality of plate-shaped ribs 16 extending in the flow path direction are provided in the air channel 15. The ribs 16 are arranged in the longitudinal (lateral) direction of the inlet air vent 11*b* with their plate surfaces being oriented vertically (perpendicularly). Thus, the cross section of the air channel 15 in the direction perpendicular to the flow path direction is divided into a plurality of sub-channels in the longitudinal (lateral) direction of the inlet air vent 11*b*. The ribs 16 extend in the direction perpendicular to the surface of the partition 11 and pass through the side wall 1*c* of the main unit case 1. The tops of the ribs 16 between the partition 11 and the side wall 1*c* of the main unit case 1 are covered with the sealing structure including an intermediate sealing wall 17 and an upper sealing wall 18, so that the air channel 15 is liquid tightly sealed from the internal space of the main unit case 1.

Figure 8:
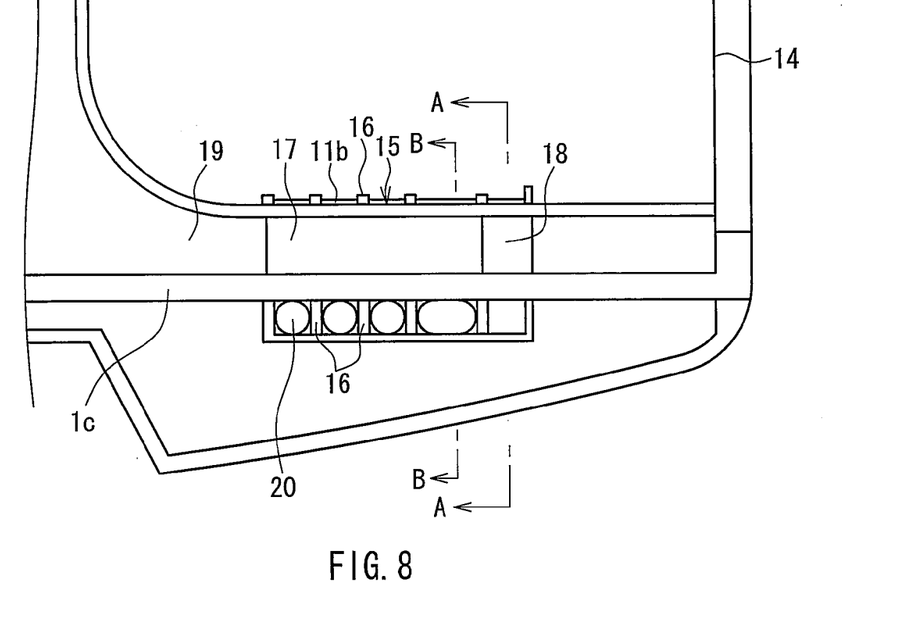
FIG. 8 is a plan view showing a structure of the air channel.
Figure 9:
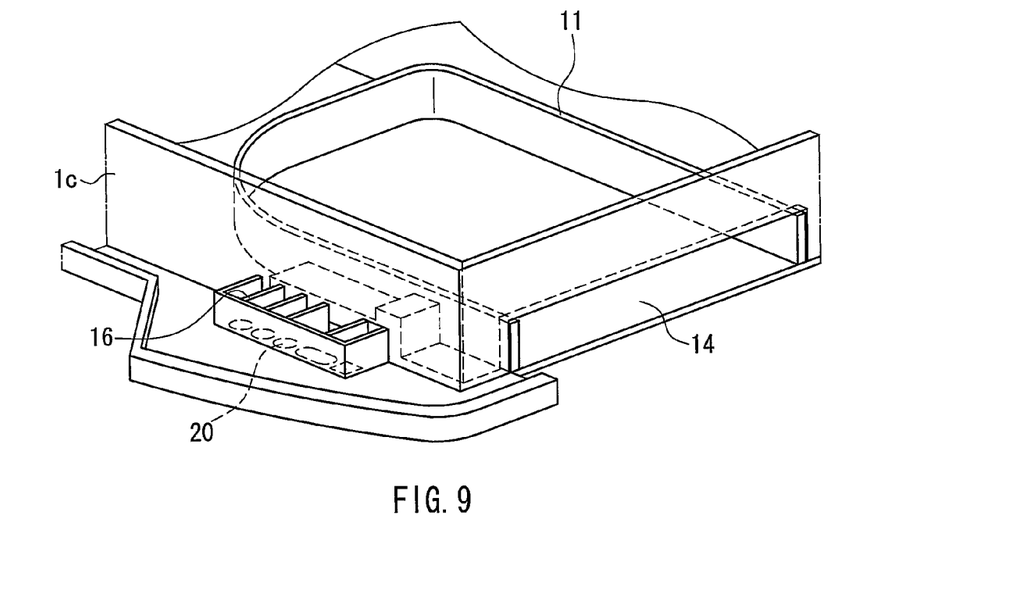
FIG. 9 is a perspective view showing a structure of the air channel.
Figure 10:
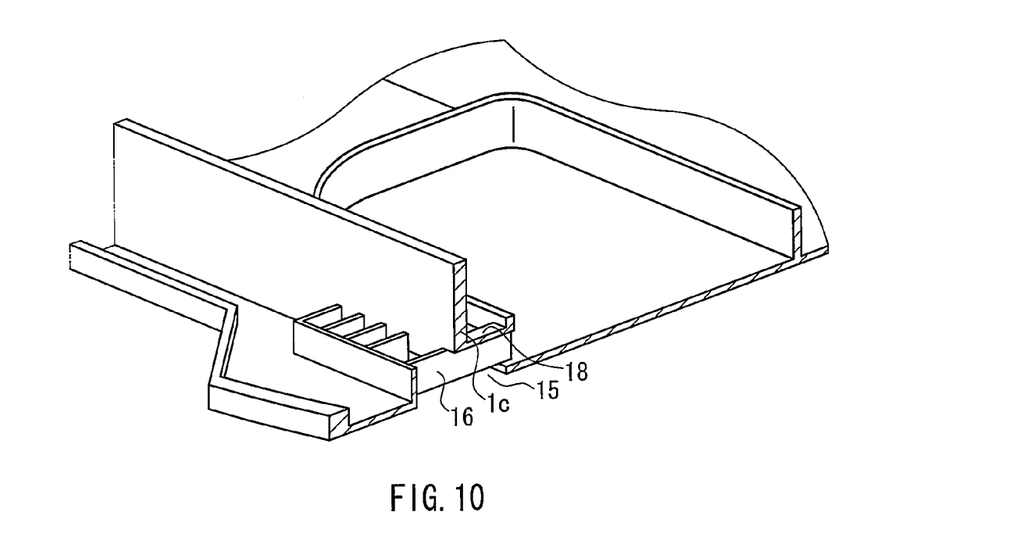
FIG. 10 is a perspective view showing the cross section of the structure of the air channel taken along the line A-A in FIG. 8.

The structure of the air channel 15 on a side of the main unit case 1 will be described with reference to FIGS. 8 to 10. FIG. 8 is a plan view showing a state in which the elements such as the cooling fan 10 located in the heat dissipation chamber 12 and the upper structure of the grip holder 8 are removed from FIG. 5. FIG. 9 is a perspective view of FIG. 8. FIG. 10 is a perspective view showing the cross section taken along the line A-A in FIG. 8, that is, a structure at a part of the upper sealing wall 18.

Figure 11:
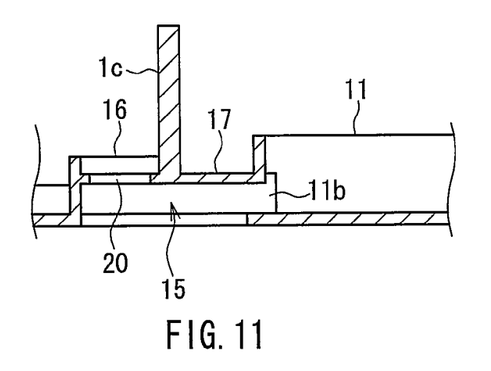
FIG. 11 is a side view showing the cross section of the structure of the air channel taken along the line B-B in FIG. 8.

As shown in FIG. 10, the ribs 16 pass through the side wall 1*c* of the main unit case 1 and extend to the outside of the side wall 1*c*, while not explicitly shown in FIGS. 8 and 9. Accordingly, the air channel 15 is formed from the inlet air vent 11*b* to the outside of the main unit case 1. The intermediate sealing wall 17 and the upper sealing wall 18 that forms the sealing structure on the tops of the ribs 16 are positioned at a predetermined height from the bottom 19 of the main unit case 1 (i.e., the upper surface for the posture of the notebook PC as shown in FIG. 1), and the air channel 15 is formed under these sealing walls 17, 18. FIG. 11 shows a side view showing the cross section of the structure of the air channel taken along the line B-B in FIG. 8, that is, a structure at a part of the intermediate sealing wall 17.

The intermediate sealing wall 17 and the upper sealing wall 18 are connected to the partition 11 of the heat dissipation chamber 12 on one side and connected to the side wall 1c of the main unit case 1 on the other side. Stepped portions between the bottom 19 and each of the intermediate sealing wall 17 and the upper sealing wall 18 and a stepped portion between the intermediate sealing wall 17 and the upper sealing wall 18 are closed off with the continuous surfaces of those sealing walls. Thus, the sealing structure is formed to prevent water leakage between the air channel 15 and the internal space of the main unit case 1.

As shown in FIG. 11, the ribs 16 extending to the outside of the side wall 1c of the main unit case 1 reach a position higher than the air channel 15 along the side wall 1c. Inlet communication apertures 20 are formed between each of the ribs 16 on the outside of the side wall 1c. Thus, the air channel 15 communicates with the first and second inlets 9a, 9b (see FIG. 6 etc) located above in FIG. 11 through the inlet communication apertures 20. The structure that allows outside air to enter through the first and second inlets 9a, 9b of the grip holder 8 is not essential. In other words, it is possible to make the inlet communication apertures 20 so as to function as inlets to the outside.

Figure 12:
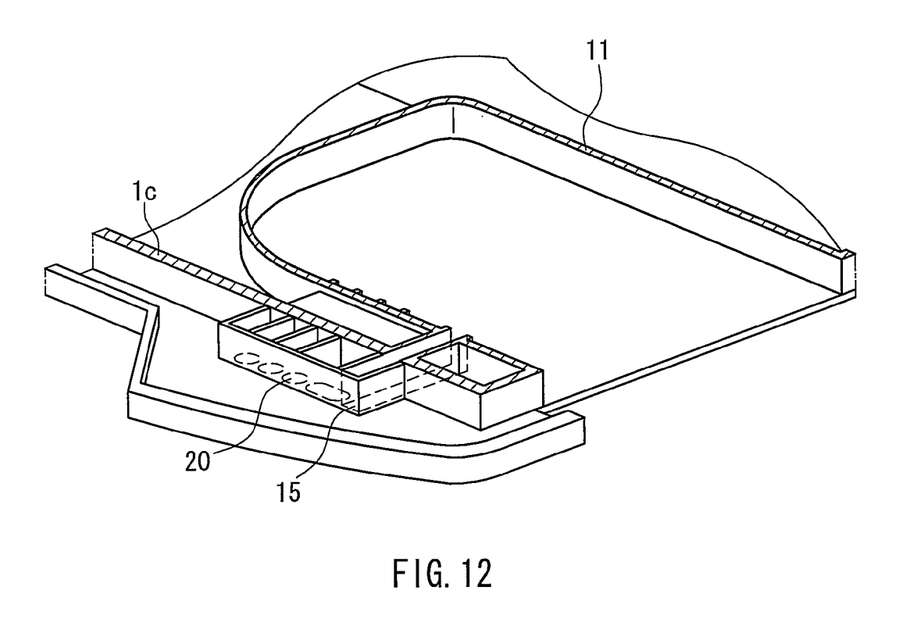
FIG. 12 is a perspective view showing the cross section of the structure of the air channel taken along a horizontal plane.
Figure 13:
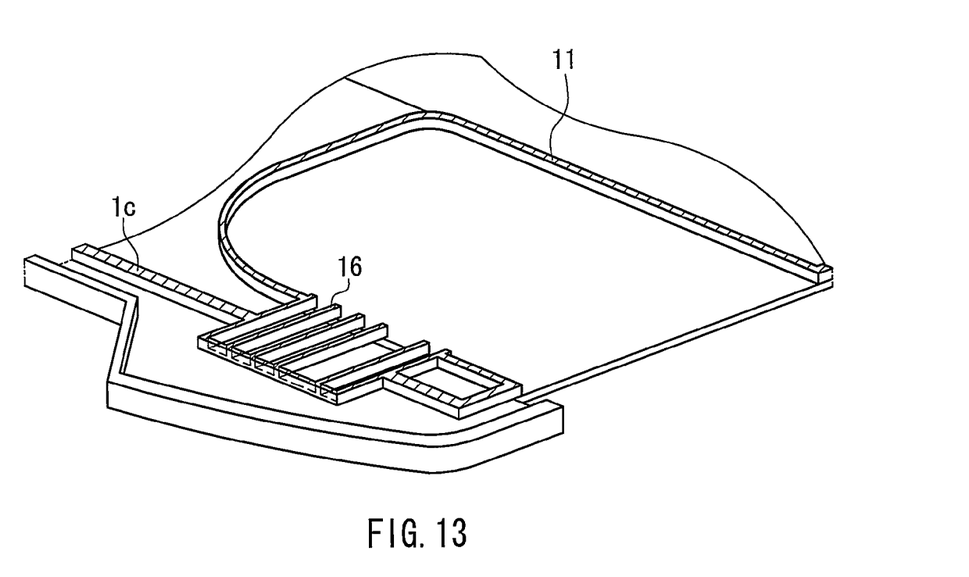
FIG. 13 is a perspective view showing the cross section of the structure of the air channel taken along a horizontal plane different from the horizontal plane for FIG. 12.

The upper sealing wall 18 is higher from the bottom 19 than is the intermediate sealing wall 17. Therefore, in the cross section taken along a horizontal plane between the upper sealing wall 18 and the intermediate sealing wall 17, as shown in FIG. 12, only the area of the air channel 15 under the upper sealing wall 18 is exposed. In the cross section taken along a horizontal plane between the intermediate sealing wall 17 and the bottom 19, as shown in FIG. 13, the entire area of the air channel 15 is exposed.

Figure 14:
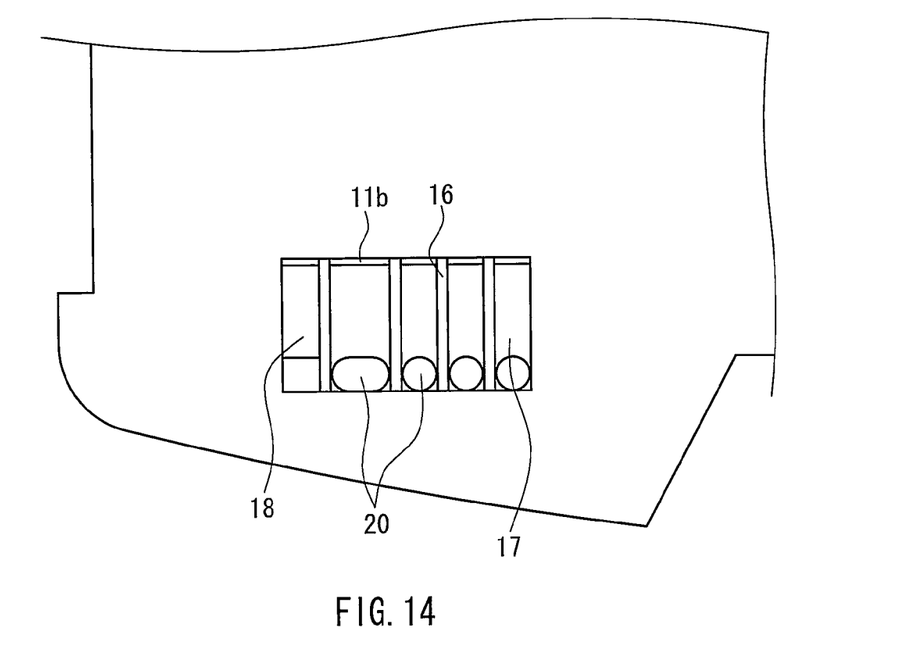
FIG. 14 is a plan view of the structure of the air channel shown in FIG. 9 when it is viewed from the back, in which some members are removed.

To increase ease of understanding of the structure of the air channel 15, FIG. 14 shows a plan view of the structure shown in FIGS. 8 to 13 when it is viewed from the back. As is evident from these drawings, the ribs 16 extend from the inlet air vent 11b of the heat dissipation chamber 12, pass through the side wall 1c of the main unit case 1, and reach a position under the inlet communication apertures 20. In FIG. 14, although the lower side of the air channel 15 is open so as to show the structure of the air channel 15, it is closed off with a plate member upon completion of the apparatus.

As described above, in the electronic apparatus of this embodiment, the air channel 15 that extends from the inlet air vent 11b through the side wall 1c of the main unit case 1 to communicate the heat dissipation chamber 12 with the inlets 9a, 9b is liquid tightly sealed from the internal space of the main unit case 1 with the sealing walls 17, 18. Moreover, a plurality of plate-shaped ribs 16 extending in the flow path direction are provided in the air channel 15 and arranged in the lateral direction of the inlet air vent 11b to divide the air channel 15 into a plurality of sub-channels.

With this configuration, the rigidity of the main unit case 1 can be ensured sufficiently while maintaining the liquid tightness between the inside of the main unit case 1 and the heat dissipation chamber 12. Since the air channel 15 for communicating the heat dissipation chamber 12 with the outside of the main unit case 1 has a structure with higher rigidity due to the plate-like ribs 16, a reduction in rigidity caused by the presence of the air channel 15 can be avoided.

In this embodiment, the notebook PC is used as an example of the electronic apparatus. However, the configuration of the present invention can be applied in the same manner to various electronic apparatuses including heat generating elements that require heat dissipation with a cooling fan, and the same effects can be obtained.

Embodiment 2

A notebook PC as an example of an electronic apparatus in Embodiment 2 will be described with reference to FIGS. 15 to 16. The notebook PC of this embodiment has the same configuration as that of the notebook PC of Embodiment 1 as shown in FIGS. 1 to 14, and therefore the following explanation also refers to some of the drawings in Embodiment 1. This embodiment is characterized in that the inlet constituting the heat dissipation structure includes the first inlet 9a and the second inlet 9b, as shown in FIGS. 3, 5, etc. In this embodiment, the first inlet 9a and the second inlet 9b are formed continuously via the edge 9c that forms the corner.

Figure 15:
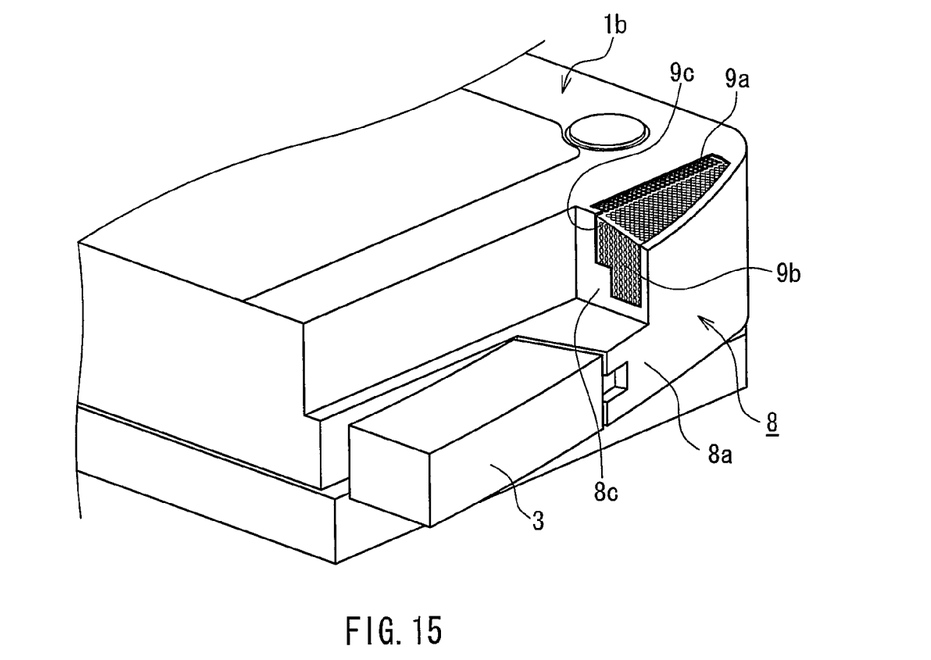
FIG. 15 is an enlarged perspective view of the vicinity of an inlet of a notebook PC as an example of an electronic apparatus in Embodiment 2 of the present invention.
Figure 16:
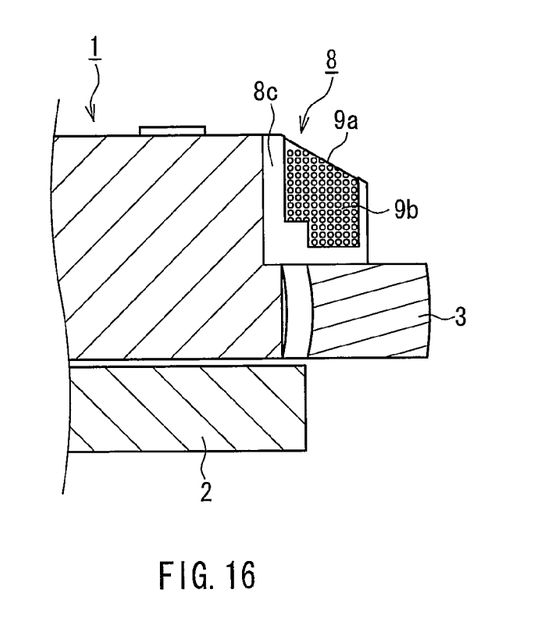
FIG. 16 is a cross-sectional view of the vicinity of the inlet shown in FIG. 15 when it is viewed from the left side.

FIG. 15 is an enlarged perspective view of the grip holder 8 in the posture of the notebook PC as shown in FIG. 3. As shown in FIG. 15, the inlets through which the cooling fan 10 draws air from the outside are composed of the first inlet 9a and the second inlet 9b, so that the air intake can be performed reliably. For example, when using only the first inlet 9a, if the main unit lower surface 1b is covered with a cloth or the like, adequate air intake cannot be achieved. In contrast, when the second inlet 9b is provided on the surface different from the main unit lower surface 1b, the air intake from the second inlet 9b is ensured, and thus adequate air intake can be achieved.

The arrangement of the inlets in a plurality of surfaces of the main unit case 1 is more important than that of the outlet. This is because even if the outlet is covered with a cloth or the like, air is blown out through the outlet under pressure so as to take it away. Consequently, the air exhaust can be ensured. On the contrary, since air is drawn from the inlet, if the inlet is covered with a cloth or the like, the pressure causes the cloth or the like to stick to the inlet. Consequently, the air intake cannot be performed.

It is desirable that the first inlet 9a includes an inclined plane that is inclined from the main unit lower surface 1b toward the main unit upper surface 1a. FIG. 15 shows such an inclined structure of the first inlet 9a. The inclined structure is shown more clearly in the enlarged views of FIGS. 16 and 17. FIG. 16 is a cross-sectional view of the inclined structure shown in FIG. 15 when it is viewed from the side, i.e., in the direction toward the stepped portion 8c of the grip holder 8. It is evident that the first inlet 9a is inclined from the main unit lower surface 1b to the main unit upper surface 1a.

Figure 17:
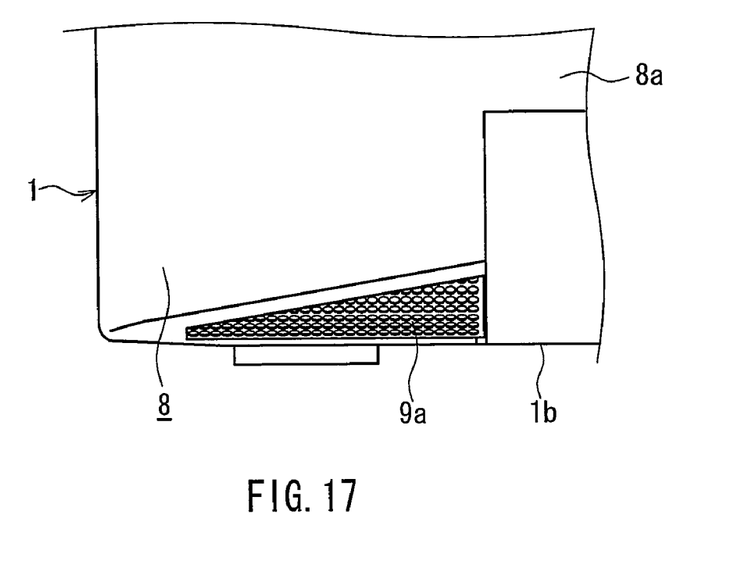
FIG. 17 is a front view of the vicinity of the inlet when the notebook PC is in the state of FIG. 2.

When the first inlet 9a is inclined in this manner, a space is formed between the first inlet 9a and the surface on which the notebook PC is placed (e.g., a desk surface) in the operating state shown in FIG. 2. FIG. 17 shows this state. FIG. 17 is a partially enlarged front view of the notebook PC in FIG. 2. Due to the presence of this inclined space, the first inlet 9a is less likely to be covered, e.g., when the notebook PC is placed on a surface having typical strength and rigidity such as a desk surface. Thus, the first inlet 9a can perform the air intake function sufficiently. Moreover, the second inlet 9b also serves to minimize the possibility that the air intake will be inadequate.

As described above, the feature of this embodiment is that the inlet of the heat dissipation structure includes the first inlet that is provided in either the lower surface or the upper surface of the main unit case and the second inlet that is provided in the side of the main unit case when the electronic apparatus such as a notebook PC is placed in the operating state. With this configuration, since the inlets are provided in a plurality of surfaces of the main unit case, even if the inlet of one surface is covered with a cloth or the like, the inlet of the other surface can ensure adequate air intake. Therefore, air is sent stably to the heat dissipation portion, and effective heat dissipation always can be performed.

In this embodiment, the notebook PC is used as an example of the electronic apparatus. However, the configuration of the present invention can be applied in the same manner to various electronic apparatuses including heat generating elements that require heat dissipation with a cooling fan, and the same effects can be obtained. Considering the application of the present invention to various electronic apparatuses other than the notebook PC, there would be more aspects in the arrangement of a plurality of inlets.

Figure 18:
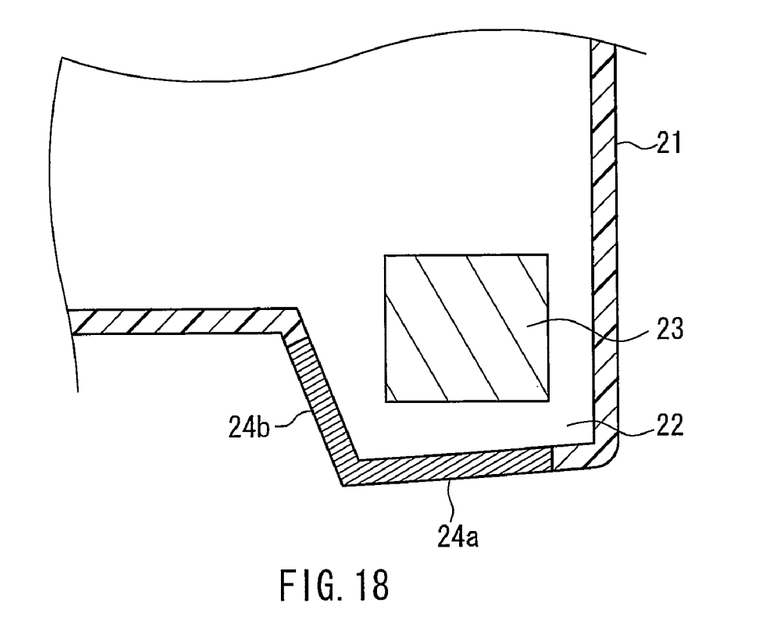
FIG. 18 is a plan view showing the cross section of a part of another example of the electronic apparatus in Embodiment 2 of the present invention.

For example, FIG. 18 shows a possible configuration. In this electronic apparatus, a protrusion 22 is provided in one corner of a main unit case 21, and a cooling fan 23 is located in the protrusion 22. The representation of other elements is omitted in FIG. 18. A first inlet 24a and a second inlet 24b are formed in two surfaces of the main unit case 21 that face the cooling fan 23, respectively. In this configuration, although both the first inlet 24a and the second inlet 24b are provided in the sides of the main unit case 21, the angles of the surfaces are different from each other. Therefore, even if one inlet is covered, the possibility of air intake from the other inlet may be maintained.

With respect to the above-mentioned embodiment, it is not essential that the main unit case has a definite outlet to exhaust the air flow from the cooling fan, depending on the aspect of the electronic apparatus. For example, if the heat dissipation portion is open in the apparatus, air may be exhausted properly through the gap present in the main unit case. The outlet of the present invention is defined as including any portion that functions substantially as an outlet such as the gap or the like present in the main unit case. This is because the essential feature of the present invention is the ventilation structure that allows air to flow from the inlet through the air channel and the sealing structure of the air channel, and the effects of these structures will not be affected by the configuration of the outlet.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic apparatus comprising:
   a main unit case that houses electric components including a heat generating element;
   a heat dissipation chamber that is formed by liquid tightly separating an internal space of the main unit case with a partition and is provided with an inlet air vent and an outlet air vent in the partition, in which a heat dissipation portion is positioned;
   a cooling fan that is located in the heat dissipation chamber so as to send air to the heat dissipation portion;
   an inlet that is provided in the main unit case to introduce outside air into the heat dissipation chamber through the inlet air vent; and
   an outlet that is provided in the main unit case to exhaust an air flow sent from the cooling fan to the outside through the outlet air vent,
   wherein an air channel for communicating the heat dissipation chamber with the inlet is formed so as to extend from the inlet air vent through a side wall of the main unit case, and is liquid tightly sealed from the internal space of the main unit case with a sealing wall, and
   a plurality of plate-shaped ribs are provided in the air channel so as to extend in a flow path direction and arranged in a lateral direction of the inlet air vent to divide the air channel into a plurality of sub-channels.

2. The electronic apparatus according to claim 1, wherein the heat dissipation chamber is provided in a corner area in a plan view of the main unit case, the inlet is provided in a side wall that forms one side of the corner area, and the outlet is provided in a side wall that forms the other side that intersects the one side provided with the inlet.

3. The electronic apparatus according to claim 1, wherein the partition for partitioning the heat dissipation chamber is formed of a partition member different from the main unit case, and the partition member surrounds the heat dissipation chamber to form a closed space.

4. The electronic apparatus according to claim 1, wherein a part of the partition for partitioning the heat dissipation chamber is formed by extending the main unit case inwardly.

5. The electronic apparatus according to claim 1, wherein at least one surface of the partition includes a removably attached cover member.

6. The electronic apparatus according to claim 1, wherein the inlet comprises a first inlet that is provided in either a lower surface or an upper surface of the main unit case and a second inlet that is provided in a side of the main unit case when the electronic apparatus is placed in an operating state.

7. The electronic apparatus according to claim 6, wherein the first inlet includes an inclined plane that is inclined from the lower surface toward the upper surface of the main unit case.

8. The electronic apparatus according to claim 6, wherein the second inlet continues to the first inlet.

9. The electronic apparatus according to claim 6, wherein a pair of grip holders is provided on one side wall of the main unit case and spaced from each other, and each of the grip holders protrudes so that a small space is formed outside the side wall,
   a hand grip grasped by hand for carrying the electronic apparatus is supported by the grip holders,
   the inlet is provided in the grip holder, and
   the air channel is open to the small space in the grip holder and thus communicates with the inlet.

10. The electronic apparatus according to claim 9, wherein the hand grip is connected between the grip holders and supported on a side of the main unit case in a position shifted toward the upper surface,
    stepped portions are formed between the lower surface of the main unit case and the connecting portions of the hand grip to each of the grip holders, and
    the first inlet is formed at a surface of the grip holder located on the same side as the lower surface of the main unit case and the second inlet is formed in the stepped portion.

* * * * *